3,726,765
MICROBIOLOGICAL HYDROLYSIS OF
PROSTAGLANDIN DIESTER
Michael R. G. Leeming, Canterbury, England, and George Greenspan, Narberth, Pa., assignors to American Home Products Corporation, New York, N.Y.
No Drawing. Filed Feb. 4, 1972, Ser. No. 223,697
Int. Cl. C12d 1/02
U.S. Cl. 195—30                3 Claims

ABSTRACT OF THE DISCLOSURE

The use of Corynespora cassiicola IMI 56007 to hydrolyze the ester functions present in 15-(R)-acetoxy-9-oxoprosta-5-cis-10,13-trans-trienoic acid, methyl ester (15-epi-$PGA_2$, acetate, methyl ester) is disclosed. The product of this hydrolysis is a useful intermediate for the synthesis of other physiologically active prostaglandins.

BACKGROUND OF THE INVENTION

Many of the class of chemical compounds known as prostaglandins have been found to have pharmacologic activity, for example they are useful as smooth muscle relaxants, hypotensive agents, and smooth muscle constrictors.

One of the more important prostaglandins is Prostaglandin $E_2$, methyl ester (abbreviated as $PGE_2$, methyl ester):

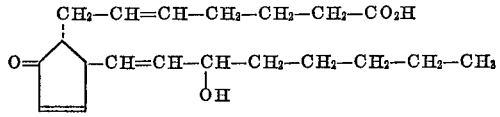

A major source of $PGE_2$ is mammalian tissue; its isolation is a costly and inefficient means of obtaining this sought after material. It would thus be desirable to have another source for this material; this additional source would, ideally, be non-mammalian in origin.

The gorgonian coral Plexaura homomalla (Esper) has been shown to contain a material which is useful as an intermediate for $PGE_2$, methyl ester. Thus the 15 epimeric Prostaglandin $A_2$, methyl ester (15-epi-$PGA_2$, methyl ester):

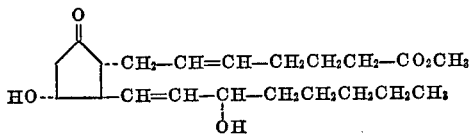

may be converted to $PGE_2$, methyl ester by the method of G. Bundy, F. Lincoln, N. Nelson, J. Pike, and W. Schneider, Annals, N.Y. Acad. Sci., 180, 76 (1971). In that procedure, the necessary intermediate, 15-epi-$PGA_2$, methyl ester, is prepared by esterification of the carboxyl group of 15-epi-$PGA_2$ which is isolated from Plexaura homomalla (Esper) as a minor product. The diester, 15-epi-$PGA_2$, acetate, methyl ester which is isolated from Plexanra homomalla (Esper) in amounts greater than 600% those of 15-epi-$PGA_2$ is not utilized in this sequence. It is thus the object of this invention, to utilize 15-epi-$PGA_2$ acetate, methyl ester, as a starting material to conveniently provide large quantities of 15-epi-$PGA_2$, the methyl ester of which is the required intermediate in the synthesis of $PGE_2$, methyl ester.

SUMMARY OF THE INVENTION

The invention sought to be patented resides in the concept of a process for preparing 15-(R)-hydroxy-9-oxoprosta-5-cis-10,13-trans-trienoic acid which comprises contacting 15 - (R) - acetoxy-9-oxoprosta-5-cis-10,13-trans-trienoic acid methyl ester with the fungus, Corynespora cassiicola IMI 56007.

According to the invention, therefore, the compound

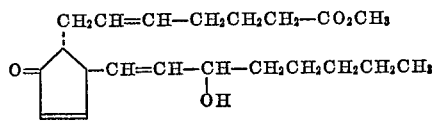

also known as 15-epi-Prostaglandin-$A_2$, or 15-epi-$PGA_2$, is provided. Examination of this compound produced according to the hereinafter described process reveals upon infrared, ultraviolet, proton magnetic, and mass spectrographic analysis, spectral data which fully supports the molecular structure as hereinbefore set forth, and as previously described in A. J. Weinheimer, and R. L. Spraggins, Tetrahedron Letters, 5185 (1969).

The product of the process of the invention possesses the inherent use characteristics of being an intermediate in the synthesis of other prostaglandin molecules, especially $PGE_2$, methyl ester.

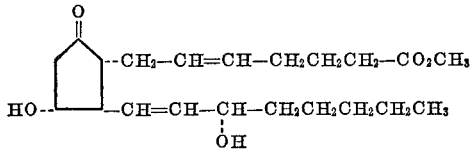

DESCRIPTION OF THE PREFERRED EMBODIMENTS

According to the process of the present invention, it has now been found possible to hydrolyze the ester functions of 15 - (R) - acetoxy-9-oxoprosta-5-cis-10,13-transtrienoic acid methyl ester (115-epi-$PGA_2$, acetate, methyl ester) by utilizing the fungus Corynespora cassiicola IMI 56007 (obtained from The Commonwealth Mycological Institute, Kew, Surrey, England).

In the process of the present invention, the 15-(R)-acetoxy-9-oxoprosta-5-cis-10,13-trans-trienoic acid, methyl ester (15-epi-$PGA_2$, acetate, methyl ester) is contacted with an aqueous suspension of mycelial cells of the fungus Corynespora cassiicola IMI 56007 for from about 0.5 to about 12 hours preferably from 1 to 5 hours at about room temperature. The temperature is not critical, but ideally is maintained between 25° and 30°. The pH of the aqueous medium may vary from about 5 to about 8. Additionally, the fermentation may be carried out either aerobically or anaerobically and with agitation or under static conditions. It will be obvious to one skilled in the art of organic chemistry that the hydrolysed product, 15-epi-$PGA_2$, may be isolated by extraction of standard procedures as for example by extraction of the aqueous medium with a water immiscible organic solvent such as ether or ethyl acetate. Drying and evaporation of the solvent followed by purification of the product, for example by chromatographic means, yields a material whose infrared, ultraviolet, proton magnetic and mass spectra are in full agreement with the structure 15-epi-PGA$_2$.

The 15-epi-PGA$_2$ so obtained may then be converted to the pharmacologically useful compound, PGE$_2$, methyl ester according to the method described in Bundy et al., supra.

The best mode contemplated by the inventors of carrying out their invention will now be set forth in the following non-limiting examples:

EXAMPLE I

An agar slant of *Corynespora cassiicola* IMI 56007 was washed with 5 ml. of distilled water and one half of resultant suspension was transferred to a 250 ml. flask with 50 ml. of the following medium:

Corn steep liquor—2 g.
Tap water—100 ml.
pH adjusted to 4.5 with 5 N NaOH before adding methyl oleate—1 g.

The flask was incubated at 28° on a rotary shaker 250 r.p.m., 2″ diameter of rotation. After four days of growth, 10 mg. of the postaglandin intermediate 15–epi-A$_2$ acetate, methyl ester diluted with 0.45 ml. of 95% ethanol was added to the flask. The air in the flask was displaced by nitrogen, and the flask was returned to the rotary shaker. A five ml. sample was taken at two hours.

The pH of the sample was lowered to pH 5.0–6.0 with HCl and extracted with 1.4 ml. of ethyl acetate. An aliquot of the solvent extract was spotted on a glass plate coated with silica gel, F254 (E. Merck), and the plate was developed in a mixture of benzene-dioxane-acetic acid 65:15:2. A UV absorbing product with the R$_f$ of 15-epi-A$_2$ was detected. After spraying the plate with a solution of phosphomolybdic acid in 95% ethanol (10%) and heating at 100° C., a positive color reaction similar to that with 15-epi-A$_2$ was obtained.

EXAMPLE II

A fermentation was prepared as in Example I, with the transformation carried out under aerobic conditions. A product similar to the one noted in Example I was formed after one hour of incubation.

EXAMPLE III

A fermentation was prepared as in Example I. The mycelial cells were separated off and suspended in water. The transformation was carried out under nitrogen. The product formed after one hour corresponded to the one seen in Example I.

EXAMPLE IV

A fermentation was prepared as in Example I in a medium composed of:

Corn steep liquor—5 g.
Peptone (Difco)—20 g.
Dextrose—20 g.
Distilled water—1 liter After one hour of incubation, the product formed was similar to that found in Example I.

EXAMPLE V

A fermentation was prepared as in Example IV. The conversion was carried out under nitrogen. The product found following one hour of incubation corresponded to that seen in Example I.

EXAMPLE VI

An agar slant of *C. cassiicola* IMI 56007 was washed with 7 ml. of distilled water, and one half of the cell suspension was transferred to a one liter flask containing 200 ml. of the medium described in Example IV. After 3 days of growth on a rotary shaker at 28°, 36 ml. of the mycelial suspension was transferred to a two liter flask with 400 ml. of the same medium.

Following 48 hours of incubation, 68 mg. of 15-epi-A$_2$ acetate, methyl ester diluted in 4 ml. of 95% ethanol was added to the flask and shaken for one hour. A 5 ml. sample was taken and processed as described in Example I. The major product possessed an R$_f$ similar to that of 15-epi-A$_2$.

Example VII

A fermentation was prepared as in Example IV except that three fourths of a cell suspension from an agar slant of *C. cassiicola* IMI 56007 was utilized to inoculate a two liter flask with 400 ml. of medium. Eighty mg. of 15-epi-A$_2$ acetate, methyl ester was converted in one hour, under static conditions, to a product with the R$_f$ of 15-epi-A$_2$.

EXAMPLE VIII

Six agar slants of *C. cassiicola* IMI 56007 were each washed with seven ml. of distilled water. One half of the resulting cell suspension was transferred to each of eleven two liter flasks containing 400 ml. of the medium described in Example IV.

After four days of incubation on a rotary shaker at 28° C., 80 mg. of 15-epi-A$_2$ acetate, methyl ester in 4 ml. of 95% ethanol was added to each flask. The contents of the flasks were harvested after one hour of incubation on the rotary shaker and filtered. The mycelia were washed with 800 ml. of warm water, and the water wash was combined with the filtrate. The combined filtrate and washings were acidified to pH 4.5 with acetic acid and filtered through a Seitz pad. The filtrate was extracted with ether (5× 200 ml.) and the extracts were washed with brine and dried over magnesium sulfate. Filtration and evaporation in vacuo gave a clear oil which was chromatographed over silica gel (Silicar CC4 Mallinckrodt) (50 g.). The column was made up in benzene and 20 ml. fractions were collected. Eluants: benzene/5% ethyl acetate 50 ml., 10% 50 ml., 15% 50 ml., 20% 50 ml., 25% 50 ml. 30% 50 ml., 35% 50 ml., 40% 50 ml., 45% 50 ml., 50% 50 ml., 55% 50 ml., 60% 50 ml., 65% 50 ml., 70% 50 ml., 50% 50 ml.

On the basis of thin layer chromatography (TLC) fractions 22–28 were combined and evaporated in vacuo giving 15-epi-PGA$_2$, 475 mg. IR$\nu_{max}$ 3400, 1720, 1600 cm.$^{-1}$, UV $\lambda_{max}^{EtOH}$ 216 m$\mu$ $\epsilon_{max}$ 9470

On treatment with sodium hydroxide $\lambda_{max}^{EtOH}$ 279 m$\mu$

EXAMPLE IX

A fermentation with 13 two-liter flasks was prepared as in Example VII. The conversion stage was carried out under static conditions at 28° C. The contents of the flasks were harvested after one hour of incubation. The mycelia were washed with one liter of warm water and the combined water wash and filtrate were treated as described in Example VIII, giving after chromatography 15-epi-PGA$_2$ (439 mg.).

EXAMPLE X

A fermentation with 15 two-liter flasks was prepared as in Example VII. Eight hundred mg. of 15-epi-A$_2$ acetate, methyl ester diluted with 4 ml. of 95% ethanol was added to each flask, a concentration of two grams per liter, for a total of 12 g. The flasks were incubated on a rotary shaker at 28° C.

The contents of the flasks were harvested at 5½ hours and filtered. The mycelia were washed with 1500 ml. of warm water, and the wash and filtrate were combined. The filtrates were acidified, filtered and extracted as described in Example VIII to give an oil which was chromatographed over silica gel (700 g. Silicar CC4 Mallinckrodt), giving 15-epi-PGA$_2$ (5.75g.).

The subject matter which the applicants regard as their invention is particularly pointed out and distinctly claimed as follows:

1. A process for preparing 15 - (R) - hydroxy - 9-oxoprosta - 5 - cis - 10,13 - trans - trienoic acid which comprises incubating 15 - (R) - acetoxy - 9 - oxoprosta-5 - cis - 10,13 - trans - trienoic acid, methyl ester with the fungus, *Corynespora cassiicola* to hydrolize the ester functions.

2. A process according to claim 1 wherein the incubating is carried out under aerobic conditions.

3. A process according to claim 1 wherein the incubating is carried out under anaerobic conditions.

References Cited

UNITED STATES PATENTS 3,290,226  12/1966  Beal et al. _____ 195—30

ALVIN E. TANENHOLTZ, Primary Examiner

U.S. Cl. X.R.

195—51 R